US 9,418,216 B2

(12) United States Patent
Wetter et al.

(10) Patent No.: US 9,418,216 B2
(45) Date of Patent: Aug. 16, 2016

(54) CLOUD SERVICE AUTHENTICATION

(75) Inventors: Allan Edwin Wetter, Seattle, WA (US);
Adrian Frei, Seattle, WA (US); Peter M. Tsang, Seattle, WA (US); Yordan Rouskov, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/187,767

(22) Filed: Jul. 21, 2011

(65) Prior Publication Data

US 2013/0024919 A1    Jan. 24, 2013

(51) Int. Cl.
G06F 7/04 (2006.01)
*G06F 21/41* (2013.01)
*G06F 21/33* (2013.01)
H04L 29/06 (2006.01)

(52) U.S. Cl.
CPC .............. *G06F 21/41* (2013.01); *G06F 21/335* (2013.01); *H04L 63/0807* (2013.01); *G06F 2221/2115* (2013.01)

(58) Field of Classification Search
CPC . G06F 21/335; G06F 21/41; G06F 221/2115; H04L 63/0807
USPC .......... 713/168–174, 182–186, 202; 709/225, 709/229; 726/2–8
See application file for complete search history.

(56) References Cited

U.S. PATENT DOCUMENTS

| | | |
|---|---|---|
| 7,150,038 B1 | 12/2006 | Samar |
| 7,174,383 B1 | 2/2007 | Biswas et al. |
| 7,925,554 B1 * | 4/2011 | Sirota ................... G06Q 10/06 705/34 |
| 8,327,441 B2 * | 12/2012 | Kumar et al. .................. 726/22 |
| 8,402,555 B2 | 3/2013 | Grecia |
| 8,533,860 B1 | 9/2013 | Grecia |
| 2007/0118890 A1 | 5/2007 | Song |
| 2008/0072301 A1 | 3/2008 | Chia et al. |
| 2009/0249439 A1 | 10/2009 | Olden et al. |
| 2009/0292927 A1 | 11/2009 | Wenzel et al. |
| 2010/0122333 A1 | 5/2010 | Noe |
| 2011/0119088 A1 * | 5/2011 | Gunn ............................... 705/3 |
| 2011/0137991 A1 * | 6/2011 | Russell ....................... 709/204 |
| 2011/0265157 A1 | 10/2011 | Ryder |

(Continued)

OTHER PUBLICATIONS

AD FS (Announcing the AD FS 2.0 Release Candidate and More; Identity and Access Team; Microsoft; Dec. 18, 2009 8:50 AM).*

(Continued)

*Primary Examiner* — Evans Desrosiers
(74) *Attorney, Agent, or Firm* — Bryan Webster; Doug Barker; Micky Minhas

(57) ABSTRACT

One or more techniques and/or systems are provided for obtaining access to a cloud service. In particular, a user may log into a client device using an operating system (OS) cloud login ID. The user may access cloud services (e.g., a music streaming service, a data storage service, etc.) through applications executing on the client device using merely the OS cloud login ID without providing additional login credentials specific to the cloud services. A client side application may request a token to access a cloud service. The token may be generated by an identity provider based upon the identity provider verifying an application ID identifying the application, a cloud service ID identifying the cloud service and/or OS cloud credentials. In this way, the application may present the token to a cloud service provider for verification to gain access to the cloud service hosted by the cloud service provider.

17 Claims, 6 Drawing Sheets

(56) References Cited

U.S. PATENT DOCUMENTS

2012/0216268 A1* 8/2012 Kassaei ............... H04L 9/3234
726/9
2012/0227098 A1 9/2012 Obasanjo et al.
2013/0042110 A1* 2/2013 Shablygin ............ G06F 21/34
713/168

OTHER PUBLICATIONS http://en.wikipedia.org/wiki/Active_Directory_Federation_Services; printed out year 2012.*
"Claims Based Identity & Access Control Guide", Retrieved at <<http://claimsid.codeplex.com/wikipage?title=Claims-Based%20Single%20Sign-On%20for%20the%20Web>>, Retrieved Date: Apr. 4, 2011, pp. 10.
"Authentication in the Cloud", Retrieved at <<http://www.likewise.com/blog/?p=371>>, Aug. 2, 2010, pp. 4.
"Single sign on at the University", Retrieved at <<http://as.exeter.ac.uk/it/systems/singlesignon/>>, Retrieved Date: Apr. 4, 2011, p. 1.
Zonka, Larry, "Subjects Covered Include Sharepoint Portal Server, SPS, SharePoint, Active Directory, Microsoft Office, and XP",Retrieved at <<http://www.eggheadcafe.com/software/aspnet/30350825/login-prompts-for-document-link-after-authentication.aspx>>, Retrieved Date: Apr. 4, 2011, pp. 4.
"Trusted Application Authentication", Retrieved at <<http://confluence.atlassian.com/display/GADGETDEV/Trusted+Application+Authentication+(Glossary+Entry)>>, Retrieved Date: Apr. 4, 2011, p. 1.
"Identity Manager and the Single Sign-on Service", Retrieved at <<http://msdn.microsoft.com/en-us/library/bb972911.aspx>>,Retrieved Date: Apr. 4, 2011, pp. 1-3.
"TriCipher Offers Cloud Single Sign-On and Federated Access for the Enterprise", Retrieved at << http://www.digitaljournal.com/pr/55093 >>, Retrieved Date : Dec. 15, 2010, pp. 3.
"Aegis Single Sign-On Appliance", Retrieved at << http://www.aegisusa.com/identity_management_solutions/appliance_point/single_sign_on.php >>, Retrieved Date : Dec. 15, 2010, pp. 2.
Buecker, et al., "Federated Identity and Trust Management", Retrieved at << http://www.redbooks.ibm.com/redpapers/pdfs/redp3678.pdf >>, 2008, p. 1-24.
"Single Sign-On in SharePoint Portal Server", Retrieved at <<http://office.microsoft.com/download/afile.aspx?AssetID=AM102437461033 >>, Jun. 9, 2004, pp. 26.
Tseng, Erick, "The Facebook Blog", Retrieved at << http://blog.facebook.com/blog.php?post=446167297130 >>, Nov. 4, 2010, pp. 5.
Microsoft Outlook—Memo Style dated May 30, 2013, 2 pgs.
Microsoft Outlook 1—Memo Style dated Jun. 10, 2013, 3 pgs.
Microsoft Outlook 2—Memo Style dated Jun. 10, 2013, 3 pgs.
Microsoft Outlook 3—Memo Style dated Jun. 10, 2013, 3 pgs.
Microsoft Outlook—Memo Style, Sep. 10, 2013, 1 pg.

* cited by examiner

CLOUD SERVICE AUTHENTICATION

BACKGROUND

Today, many data service providers utilize a cloud computing model that may allow users to consume and/or interact with cloud services over the internet. A user may access such cloud services though applications hosted on a client device, such as a laptop, tablet computer, smart phone, etc. In one example, a user may stream movies from an online movie subscription service using a locally hosted movie player application. In another example, a user may play video games from an online game streaming service using a locally hosted game player application. In other examples, users may read emails, store files, interact with social networks and/or consume a plethora of other services from cloud service providers. Unfortunately, a user may have separate and/or unique account information, such as login ID and password, for various cloud service providers (e.g., a user may have a movie login for a movie service provider, a photo login for a photo service provider, etc.). For example, a user may have hundreds of different accounts for which respective login or authentication information may be required, which may be cumbersome for the user to maintain. In this way, a user may have to separately login to various cloud service providers within a single computing session. For example, a user may log into a personal computer with an operating system login. Next, the user may check an email account by inputting an email login into an email service, upload photos by inputting a photo login to a photo service, listen to music by inputting a music login to a music service, etc. Within the same computing session, the user may have to login ten or more times to access various data and/or services. Thus, the user may be burdened with memorizing and/or inputting multiple distinct logins to access cloud services. Additionally, when providing cloud services to client applications, cloud service providers may be susceptible to unauthorized applications hosted on the client device. In one example, an unauthorized application may attempt to impersonate an authorized application in order to consume data and/or services from a cloud service provider that the unauthorized application may not have authority to access.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for providing access to a cloud service and/or for obtaining access to a cloud service are disclosed herein. It may be appreciated that a cloud service provider may, among other things, be a service provider that provides cloud services, such as data and/or services, over the internet to a client device. In particular, the client device may comprise an operating system that may host one or more applications configured to access cloud services hosted by cloud service providers (e.g., a user may access movies from a movie service provider over the internet using a movie player application hosted by a mobile operating system of a client smart phone). Accordingly, a request from an application hosted by an operating system (OS) to access a cloud service may be received (e.g., an operating system of a client device may receive the request from the application, such as a movie player application executing within the operating system).

In may be appreciated that the cloud service may be associated with a cloud service ID identifying the cloud service, which may be specified within the request from the application. It may be appreciated that the application may be associated with an application ID that may be used to verify the genuineness of the application, which may deter an application from impersonating another application (e.g., the operating system may inhibit a non-genuine application from modifying a first application ID assigned to the non-genuine application to a second application ID assigned to a genuine application). Accordingly, the application may be unable to modify the application ID, and thus the application ID may securely identify the genuineness of the application. It may be appreciated that a user may have logged into the operating system using an OS cloud login ID that may allow the user to access various cloud services without having to submit separate login credentials specific to the respective cloud services (e.g., the OS cloud login may associate the user with a plurality of cloud services from various cloud service providers).

A token request may be sent to an identity provider based upon the request from the application (e.g., the operating system may receive the request from the application, and may create and/or send the token request to a cloud based verification service). The token request may comprise the application ID identifying the application, the cloud service ID associated with the cloud service and/or OS cloud credentials associated with login credentials of the user for the operating system. It may be appreciated that in one example, the OS cloud credentials may correspond to a cloud login ID and/or additional authentication information (e.g., additional authentication information provided by the operating system to the user based upon the user successfully authenticating with the operating system on the user's device using the OS cloud login ID). This may, for example, make it difficult, if not impossible, for someone to use a user's (stolen) user name and password, for example, to consume information on a different device and/or via a different operating system. That is, even though a somewhat successful login may be accomplished using the user's (stolen) user name and password, for example, the additional (OS related) authentication information would not be provided because the login would occur on a different operating system and/or device, for example. The identity provider may be configured to create a token based upon the token request. In one example, the identity provider may create the token based upon determining the application is authorized to access the cloud service based upon the application ID. In another example, the identity provider may compute a user assigned ID (e.g., an identifier for the user) based upon the cloud service ID and a user identification associating the user with the identity provider (e.g., the assigned ID may be derived from the user identification uniquely for an application). The token may comprise the application ID, the cloud service ID and/or the user assigned ID. The identity provider may sign the token with an identity provider signature. It may be appreciated that the identity provider signature may be used to verify that the token originated from the identity provider, as opposed to a malicious source (e.g., the identity provider signature may confirm that the token was not generated and/or modified by an entity other than the identity provider). Additionally, in one example, the identity provider may encrypt the token (e.g., the identity provider may encrypt the token using an encryption key corresponding to a decryption key held by the cloud service provider of the cloud service).

In this way, the token may be received from the identity provider based upon the identity provider verifying the token request. The token may be provided to the application for submission to the cloud service provider for access to the cloud service. The token may be submitted to the cloud service provider, which may provide the application with access to the cloud service based upon verifying the token. In one example, the cloud service provider may validate the identity provider signature as a signature of the identity provider, which may verify that a malicious source did not create the token. In another example, the cloud service provider may determine whether the application is authorized to access the cloud service based upon the application ID (e.g., a non-genuine bank application may be denied access to a banking service based upon a banking service provider determining an application ID of the non-genuine bank application does not identify the non-genuine bank application as an approved and/or genuine banking application). In another example, the cloud service provider may provide the application with access to data associated with a user account of a user identified by the user assigned ID (e.g., a real bank application may be provided with banking data associated with a bank account of the user identified by the user assigned ID).

It may be appreciated that the user may sign into the client device, such as the operating system, with a single OS cloud login ID. The OS cloud login ID may allow the user to access a plethora of cloud services without having to input additional login credentials specific to the cloud services. In this way, the user may consume cloud services through applications that successfully obtain tokens from the identity provider that are verifiable by the cloud service providers.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
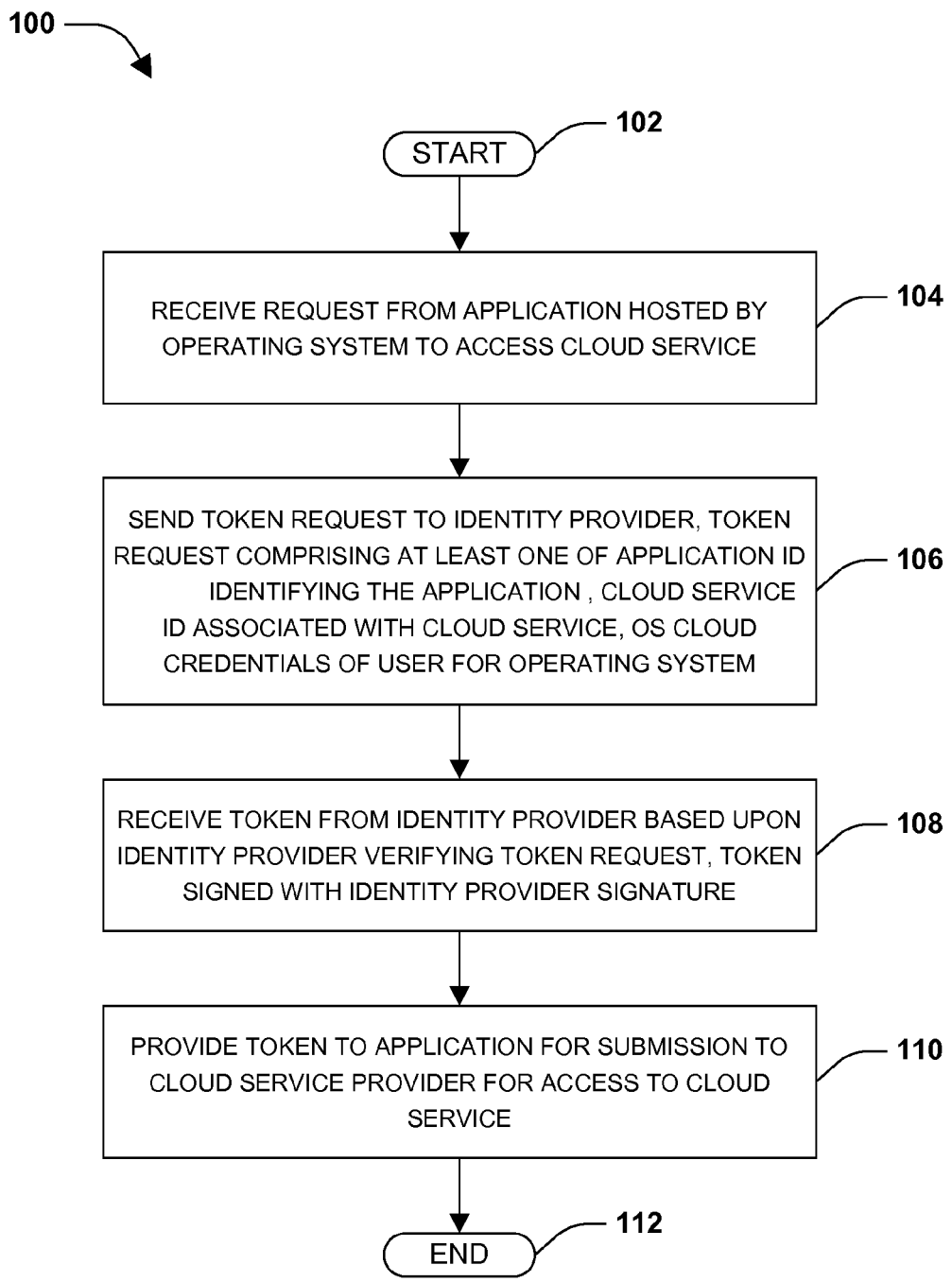
FIG. 1 is a flow chart illustrating an exemplary method of providing access to a cloud service.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many client devices, such as smart phones and personal computers, host applications that may consume data and/or services from cloud service providers based upon a cloud computing model. In one example, a social network application may allow a user to interact with social media provided by a social network service provider. In another example, a document application may allow a user to create, upload, edit and/or share documents from a document service provider. Unfortunately, a user may have separate accounts for various cloud service providers. As such, the user may have a plurality of login identities for the respective cloud service providers (e.g., a photo service login, a social network login, etc.). In this way, the user may be burdened with managing a large number of login identities that may be separately inputted for the respective cloud services.

Additionally, the cloud computing model may leave cloud service providers susceptible to malicious applications hosted on client devices. For example, a non-genuine application may attempt to impersonate a genuine application to gain access to a cloud service provider. In this way, the non-genuine application may attempt to access unauthorized content and/or cause other malicious damage to the cloud service provider.

Accordingly, one or more systems and/or techniques for providing access to a cloud service and/or for obtaining access to a cloud service are provided herein. In particular, a user may log into a client device, such as an operating system (OS), using an OS cloud login ID. The OS cloud login ID may be a universal cloud identifier that may allow the user to access various cloud services (e.g., a movie service provided by a movie company, a photo service provided by a photo company and/or a plethora of other services provided by different entities) without providing login credentials specific to the respective cloud services. A request from an application to access a cloud service identified by a cloud service ID may be received from the application. A token request comprising an application ID identifying the application, the cloud service ID and/or OS cloud credentials (e.g., authentication information and/or calls corresponding to the OS cloud login ID) may be sent to an identity provider (e.g., a cloud based verification service) based upon the request from the application. The identity provider may verify the token request. For example, the identity provider may verify that the application has authority to access the cloud service based upon the application ID. The identity provider may compute a user assigned ID, which may be used as a user identifier, based upon the cloud service ID and a user identification associating the user with the identity provider (e.g., the user assigned ID may comprise an identifier for the user derived from the user identification unique to the application). In one example, the user assigned ID may comprise a user pairwise ID (e.g., a user pairwise ID computed from a pairwise function using a cloud service ID and/or a user identification). It may be appreciated that in one example, user authentication may be performed to allow the user assigned ID to be computed (e.g., a SmartCode, a code sent by phone, a code sent by email, biometrics, username/password, and/or a variety of other authentication techniques). In this way, the identity provider may create a token comprising the user assigned ID, the cloud service ID and/or the application ID. The token may be signed with an identity provider signature.

The token may be used by the application to access the cloud service hosted by a cloud service provider. The cloud service provider may verify the identity provider signature, verify the application ID and/or provide the application with access to data associated with a user account of the user identified by the user assigned ID. In this way, the user may utilize applications having verifiable tokens to consume data and/or services from various cloud service providers based upon the OS cloud login ID without providing additional login credentials specific to the cloud service providers.

One embodiment of providing access to a cloud service is illustrated by an exemplary method 100 in FIG. 1. At 102, the method starts. At 104, a request may be received from an application hosted by an operating system to access a cloud service. The cloud service may be identified by a cloud service ID. It may be appreciated that a user of the application may have logged into the operating system using an OS cloud login ID (e.g., a universal login associated with a plurality of cloud services and/or cloud service providers). The OS cloud login ID may allow the user to access a plurality of cloud service providers without additional login information specific to the various cloud service providers.

To inhibit impersonation and/or facilitate trust in applications, application IDs may be securely assigned to applications (e.g., an application ID may be a unique identifier assigned to an application based upon an operating system application programming model that may have been complied when the application was developed for the operating system). An application ID of an application may be tamper resistant, and thus may be relied upon when determining whether an application is who the application alleges it is (e.g., a malicious application may be unable to modify an application ID assigned to the malicious application, such that the malicious application may be unable to impersonate an application ID of a genuine application). In this way, the application requesting access to the cloud service may be trusted as being an application associated with the application ID assigned to the application.

At 106, a token request may be sent to an identity provider (e.g., a cloud based verification service). The token request may comprise the application ID identifying the application, the cloud service ID associated with the cloud service and/or the OS cloud credentials associated with login credentials of the user for the operating system.

At 108, a token may be received from the identity provider based upon the identity provider verifying the token request. The token may be signed with an identity provider signature by the identity provider.

In one example of receiving the token, the identity provider may have verified the token request by determining that the application is authorized to access the cloud service based upon the application ID (e.g., a table identifying which applications may access what cloud services may be queried using the application ID). In one example, if the application is authorized to access the cloud service, then the identity provider may create the token. In another example, if a relationship between the application and the cloud service is unknown, then the identity provider may nevertheless create the token because the cloud service provider may still allow, deny or modify access to the cloud service based upon the application ID that may be specified within the token. That is, various applications may have relationships with cloud services that may not be known by the identity provider. Thus, instead of denying the application the token, the identity provider may provide the token to the application so that the cloud service may have control over whether the application may consume services from the cloud service. In another example, if the application is not authorized to access the cloud service, then the identity provider may deny the token request.

In another example of receiving the token, upon verifying the token request, the identify provider may have computed a user assigned ID identifying the user uniquely for the application (e.g., user pairwise ID). For example, the user assigned ID may be computed (e.g., a pairwise computation) based upon the cloud service ID and/or a user identification associating the user with the identity provider (e.g., the user assigned ID may be derived from the user identification uniquely for the application).

The token may comprise the application ID, the cloud service ID and/or the user assigned ID. At 110, the token may be provided to the application for submission to the cloud service provider for access to the cloud service. In one example, the application may obtain access to the cloud service based upon the cloud service provider validating the identity provider signature as a signature of the identity provider (e.g., the cloud service provider may verify the identity provider signature). In another example, the application may obtain access to the cloud service based upon the cloud service provider determining that the application is authorized to access the cloud service based upon the application ID (e.g., a music cloud service may determine whether a music player application has authorization to play music from the music cloud service based upon an application ID of the music player application). In another example, the application may obtain access to data associated with a user account of the user identified by the user assigned ID from the cloud service (e.g., the user may have an account with a music cloud service that allows the user to consume certain songs purchased by the user). In this way, the application may be provided with access to the data without requesting from the user additional login credentials specific to the cloud service. Accordingly, the user may consume the cloud service based upon merely inputting the OS cloud login ID. At 112, the method ends.

Figure 2:
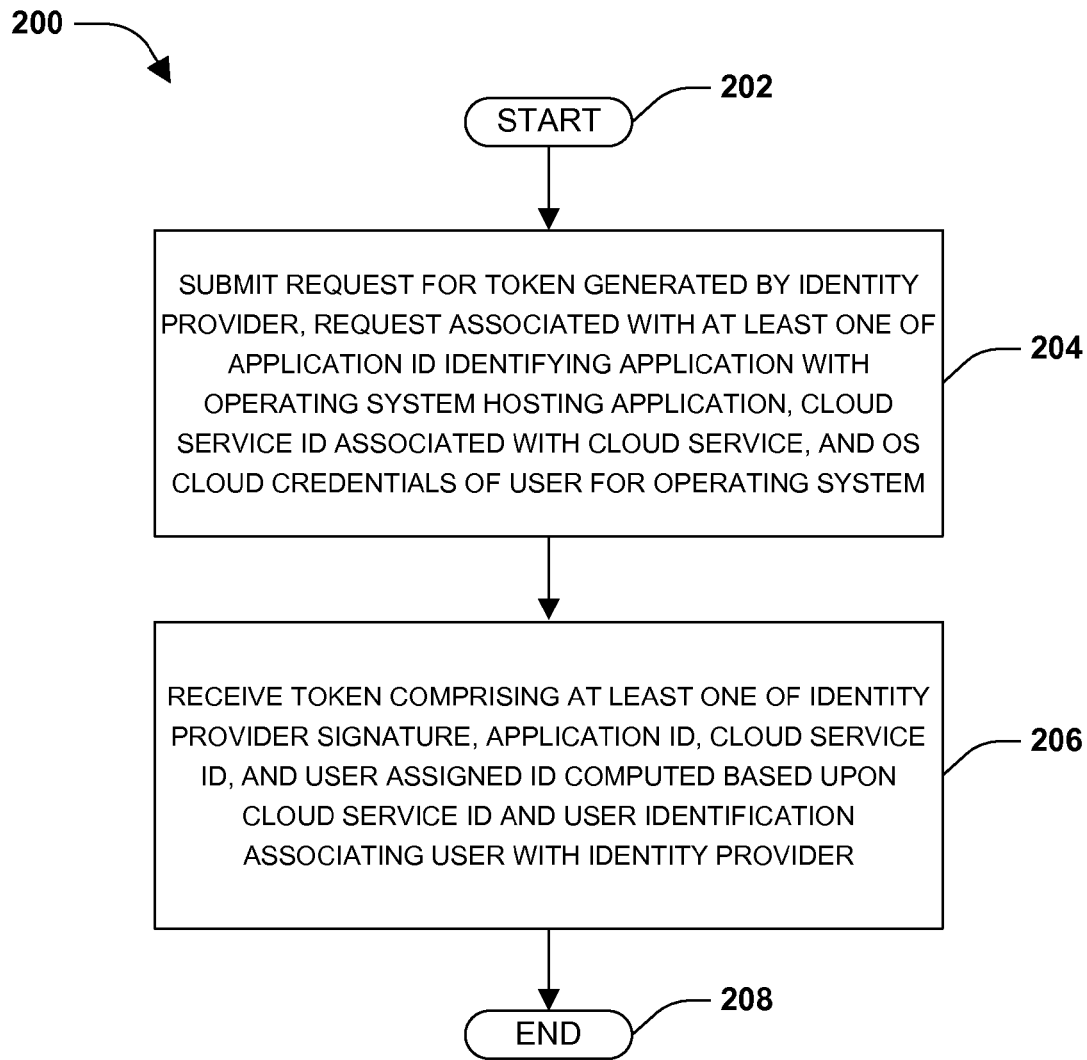
FIG. 2 is a flow chart illustrating an exemplary method of obtaining access to a cloud service.

One embodiment of obtaining access to a cloud service is illustrated by an exemplary method 200 in FIG. 2. At 202, the method starts. At 204, a request for a token generated by an identity provider may be submitted (e.g., in response to receiving the request from an application, a token provider component may send a token request to an identity provider to generate the token). The requested token may correspond to a cloud service identified by a cloud service ID (e.g., the token may allow an application to consume data and/or services from the cloud service). The request may be made to a token provider component and/or an operating system (OS) by an application identified by an application ID. The operating system may have been logged into by a user using an OS cloud login ID. As such, the request may be associated with the application ID identifying an application within the operating system hosting the application, the cloud service ID associated with the cloud service and/or OS cloud credentials associated with login credentials of the user for the operating system.

At 206, the token may be received. That is, the token may have been generated by the identity provider based upon the identity provider verifying a token request (e.g., a token request submitted by a component that received the request from the application). The identity provider may have generated the token based upon verifying the application ID, creating a user assigned ID (e.g., a user pairwise ID) from the cloud service ID and a user identification associating the user with the identity provider and/or signing the token with an identity provider signature. It may be appreciated that in one example, the token and/or the user assigned ID may be encrypted to keep the user assigned ID secret from third parties (e.g., the identity provider may encrypt the token using an encryption key corresponding to a decryption key held by the cloud service provider of the cloud service). Accordingly, the token may comprise the identity provider signature, the application ID, the cloud service ID and/or the user assigned ID identifying the user.

The token may be submitted to the cloud service provider to obtain access to data associated with a user account of the user identified by the user assigned ID from the cloud service (e.g., a music player application may submit the token to a music service provider to access music owned by a user identified by the user assigned ID). Access to the cloud service may be granted based upon the cloud service provider validating the identity provider signature as a signature of the identity provider. In addition, the cloud service provider may determine whether the application is authorized to access the cloud service based upon the application ID. In this way, data from the cloud service may be obtained without the user having to submit additional login credentials specific to the cloud service. Instead, the user can access a plurality of cloud services from various cloud service providers merely based upon the OS cloud login ID. At 208, the method ends.

Figure 3:
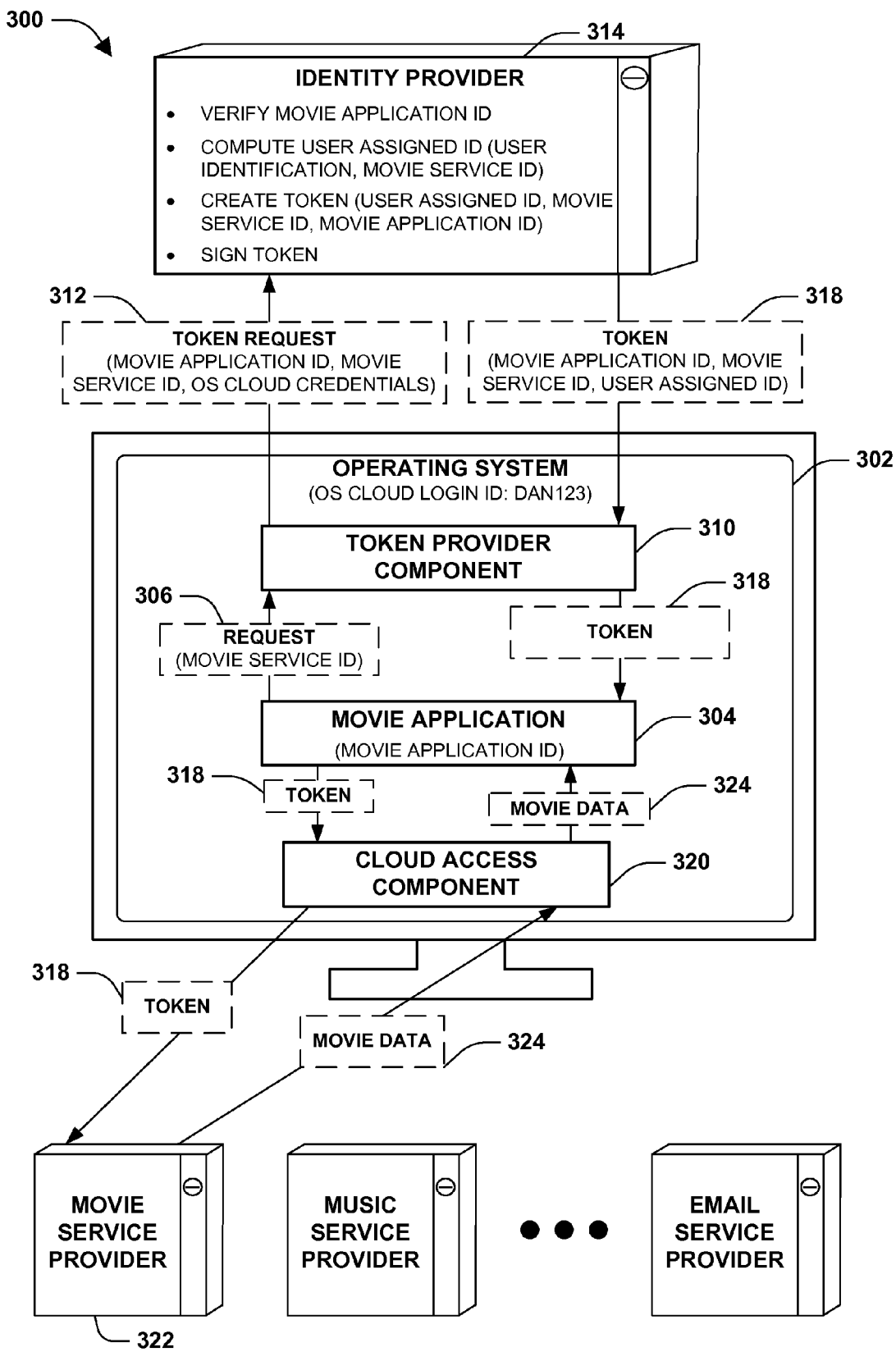
FIG. 3 is a component block diagram illustrating an exemplary system for providing access to a cloud service.

FIG. 3 illustrate an example of a system 300 configured to provide access to a cloud service. The system 300 may comprise a token provider component 310 and/or a cloud access component 320. The token provider component 310 may be configured to receive a request 306 from an application (e.g., a movie application 304 identified by a movie application ID) hosted by an operating system 302 to access a cloud service (e.g., a movie service hosted by a movie service provider 322). The request 306 may identify the cloud service using a cloud service ID (e.g., a movie service ID of the movie service). It may be appreciated that a user may have logged into the operating system 302 using an OS cloud login ID (e.g., Dan123), which may allow the user to access a plethora of cloud services using merely the OS cloud login ID, as opposed to separately providing login credentials specific to the various cloud services.

The token provider component 310 may send a token request 312 to an identity provider 314 for a token 318, which may be used by the movie application 304 to access the movie service hosted by the movie service provider 322, for example. The token request 312 may comprise the movie application ID, the movie service ID and/or OS cloud credentials (e.g., authentication information and/or calls corresponding to the OS cloud login ID). The identity provider 314 may verify the token request. In one example, the identity provider 314 may determine whether the movie application 304 is authorized to access the movie service provider 322 based upon the movie application ID. Additionally, the identity provider 314 may compute a user assigned ID identifying the user (e.g., a user pairwise ID computed from a pairwise function using a cloud service ID and/or a user identification). In particular, the user assigned ID may be computed based upon the movie service ID and/or a user identification associating the user with the identity provider 314. In this way, the identity provider may generate the token 318, which may comprise the user assigned ID identifying the user, the movie service ID identifying the movie service and/or the movie application ID identifying the movie application 304. The identity provider 314 may sign the token 318 with an identity provider signature. In one example, the identity provider 314 may encrypt the token 318. The token provider component 310 may receive the token 318 from the identity provider 314. The token provider component may provide the token 318 to the movie application 304.

The cloud access component 320 may facilitate the submission of the token 318 to the movie service provider 322 to obtain access to the movie service for the movie application 304. For example, the movie application 304 may submit the token 318 through the cloud access component 320 to the movie service provider 322. The movie application 304 may obtain access to movie data 324 of the movie service based upon the movie service provider 322 verifying the token 318. In one example of verifying the token 318, the movie service provider 322 may validate the identity provider signature as a signature of the identity provider 314. In another example of verifying the token 318, the movie service provider 322 may determine whether the movie application 304 is authorized to access the movie service based upon the movie application ID. Upon verification of the token 318, the movie service provider 322 may provide access to the movie data 324 that is associated with a movie user account of the user identified by the user assigned ID (e.g., a movie account of the user with the movie service may have access to particular movies purchased by the user). In this way, the movie application 304 may consume movie data 324 from the movie service provider 322 using the token 318 without requesting login credentials specific to the movie service provider 322. It may be appreciated that where the token 318 is signed by the identity provider 314, the movie service provider 322 (or other relevant cloud service provider) may verify the signature, thus confirming that the token originated from the identity provider and/or that another entity did not modify the token.

It may be appreciated that in one example, one or more cloud access components may be implemented. For example, the movie application 304 may define a first cloud access component configured to facilitate access to the movie service provider 322, a second application may define a second cloud access component configured to facilitate access to a second service provider, etc.

Figure 4:
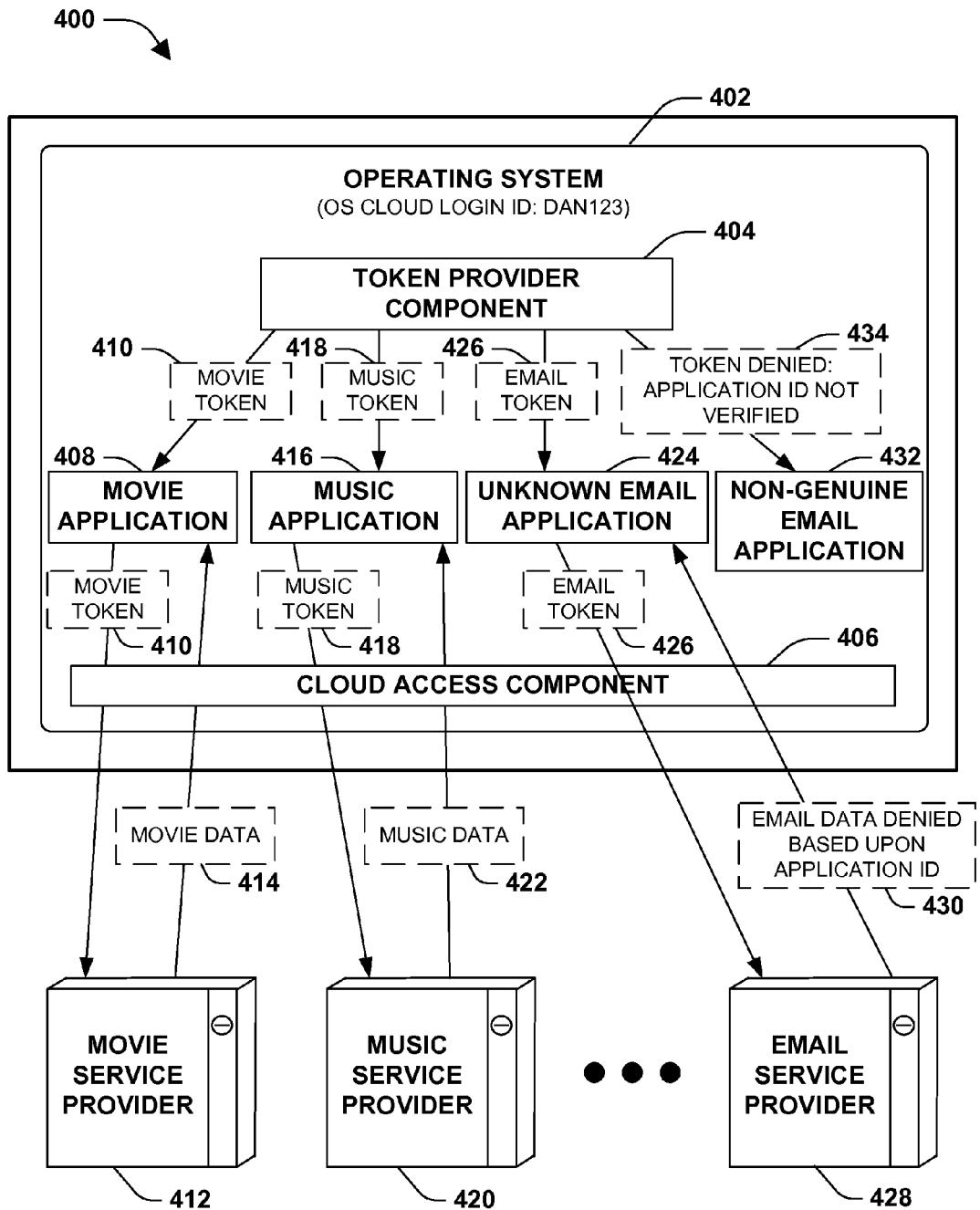
FIG. 4 is an illustration of an example of a user accessing a plurality of cloud services using merely an OS cloud login ID without additional login credentials specific to the cloud services.

FIG. 4 illustrates an example 400 of a user accessing a plurality of cloud services using merely an OS cloud login ID without additional login credentials specific to the cloud services. A user may log into an operating system 402 using the OS cloud login ID (e.g., Dan123). The operating system 402 may host a movie application 408, a music application 416, an unknown email application 424, a non-genuine email application 432 and/or a variety of other applications that may consume data and/or services from cloud service providers (e.g., movie service provider 412, music service provider 420, email service provider 428, etc.). The applications may request tokens from a token provider component 404, which may be used to access the cloud service providers. The token provider may submit token requests to an identity provider (not shown) to generate the tokens for the applications. The applications may use the tokens through a cloud access component 406 to access cloud services hosted by the cloud service providers. It may be appreciated that in one example, one or more cloud access components may be implemented (e.g., a movie cloud access component configured by the movie application 408 to facilitate communication between the movie application 408 and the movie service provider 412, a music cloud access component configured by the music application 416 to facilitate communication between the music application 416 and the music service provider 420, etc.). For example, a cloud access component may be comprised within an application, and may be configured to facilitate communication between the application and a cloud service provider using a particular protocol. That is, even though FIG. 4 illustrates the cloud access component outside of applications 408, 416, 424, 432, the cloud access component (and/or one or more respective cloud access components)

may be implemented within one or more of the applications 408, 416, 424, and/or 432 (e.g., as a protocol based component(s)).

In one example, the movie application 408 may request a movie token 410 from the token provider component 404 to access a movie service identified by a movie service ID. The token provider component 404 may submit a token request to the identity provider. The token request may comprise a movie application ID identifying the movie application 408, the movie service ID identifying the movie service and/or OS cloud credentials. The identity provider may generate, sign and/or encrypt the movie token 410 based upon verifying that the movie application 408 is authorized to access the movie service. The movie token 410 may comprise the movie application ID, the movie service ID and/or a user assigned ID identifying the user. In this way, the token provider component 404 may provide the movie token 410 to the movie application 408, which may submit the movie token 410 to the movie service provider 412 through the cloud access component 406. Upon verifying the movie token 410 (e.g., verifying an identity provider signature and/or the movie application ID), the movie service provider 412 may allow the movie application 408 to consume movie data 414 associated with a user movie account of the user identified by the user assigned ID without requiring login credentials specific to the movie service.

In another example, the music application 416 may request a music token 418 from the token provider component 404 to access a music service identified by a music service ID. The token provider component 404 may submit a token request to the identity provider. The token request may comprise a music application ID identifying the music application 416, the music service ID identifying the music service and/or OS cloud credentials. The identity provider may generate, sign and/or encrypt the music token 418 based upon verifying that the music application 416 is authorized to access the music service. The music token 418 may comprise the music application ID, the music service ID and/or a user assigned ID identifying the user. In this way, the token provider component 404 may provide the music token 418 to the music application 416, which may submit the music token 418 to the music service provider 420 through the cloud access component 406. Upon verifying the music token 418 (e.g., verifying an identity provider signature and/or the music application ID), the music service provider 420 may allow the music application 416 to consume music data 422 associated with a user music account of the user identified by the user assigned ID without providing login credentials specific to the music service.

In another example, the unknown email application 424 may request an email token 426 from the token provider component 404 to access an email service identified by an email service ID. The token provider component 404 may submit a token request to the identity provider. The token request may comprise an email application ID identifying the unknown email application 424, the email service ID identifying the email service and/or OS cloud credentials. The identity provider may determine that a relationship between the unknown email application 424 and the email service provider 428 has not been specified to the identity provider (e.g., the identity provider may not have knowledge of an existing relationship between the unknown email application 424 and the email service provider 428; no relationship may exist between the unknown email application 424 and the email service provider 428; etc.). However, the identity provider may nevertheless generate, sign and/or encrypt the email token 426 because the email service provider 428 may, for example, still make the final determination as to whether the unknown email application 424 is authorized to access email data from the email service. The email token 426 may comprise the email application ID, the email service ID and/or a user assigned ID identifying the user. In this way, the token provider component 404 may provide the email token 426 to the unknown email application 424, which may submit the email token 426 to the email service provider 428 through the cloud access component 406. The email service provider 428 may determine that the unknown email application 424 is not authorized to access email data based upon the email application ID (e.g., the email application ID may not match a list of application IDs of approved email applications for the email service provider 428). In this way, the email service provider 428 may deny 430 the unknown email application 424 access to the email service.

In another example, the non-genuine email application 432 may request an email token from the token provider component 404 to access the email service identified by the email service ID. The token provider component 404 may submit a token request to the identity provider. The token request may comprise a non-genuine email application ID identifying the non-genuine email application 432, the email service ID identifying the email service and/or OS cloud credentials. The identity provider may determine that the non-genuine email application 432 does not have authorization to access the email service. The identity provider may deny 434 the email token based upon the failure to validate the non-genuine email application ID of the non-genuine email application 432 (e.g., the non-genuine email application ID may not match a list of approved email applications for the email service provider 428). In this way, the non-genuine email application 432 may be unable to obtain access to email data from the email service provider 428 because the non-genuine email application 432 does not have an email token.

Figure 5:
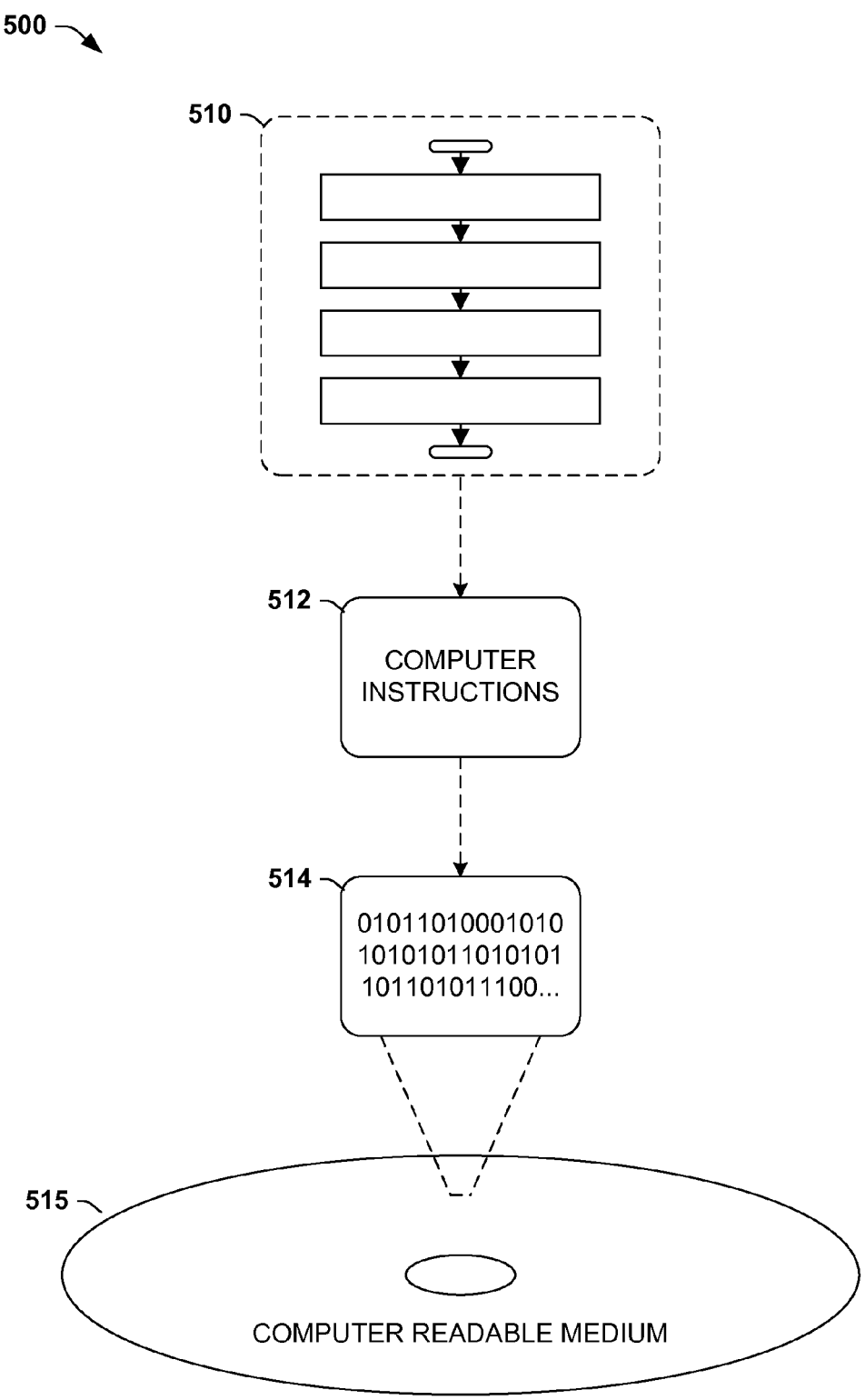
FIG. 5 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 516 (e.g., a CD-R, DVD-R, or a platter of a hard disk drive), on which is encoded computer-readable data 514. This computer-readable data 514 in turn comprises a set of computer instructions 512 configured to operate according to one or more of the principles set forth herein. In one such embodiment 500, the processor-executable computer instructions 512 may be configured to perform a method 510, such as at least some of the exemplary method 100 of FIG. 1 and/or exemplary method 200 of FIG. 2, for example. In another such embodiment, the processor-executable instructions 512 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

It may be appreciated that at least one of A and B and/or the like generally means A or B or both A and B.

Figure 6:
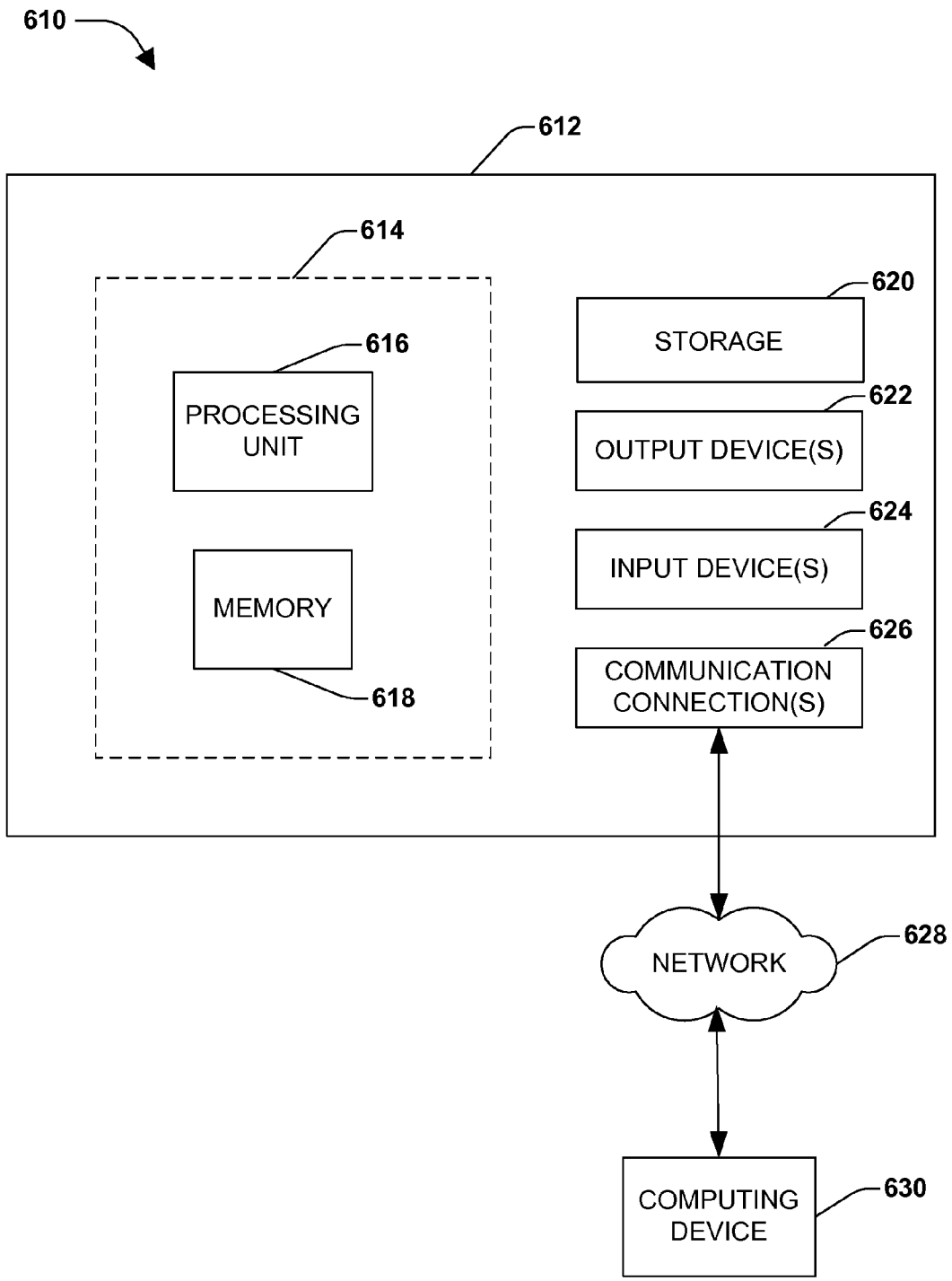
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 610 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at a computer system that includes one or more processors, for providing access to a cloud service, the method comprising:
   receiving a request from an application hosted by an operating system (OS) to access a cloud service;
   sending a token request to an identity provider responsive to the receiving a request, the token request comprising (i) an application identifier (ID) identifying the application, (ii) an OS cloud credential of a user of the OS and that is associated with login credentials of the user for the OS, and (iii) and a cloud service ID that is associated with the cloud service;
   based at least on sending the token request, and based upon the identity provider having authenticated the user and verified that the application ID is a valid application ID for the application, receiving a token from the identity provider, the token comprising (i) the cloud service ID, (ii) the application ID, and (iii) a user assigned ID that is associated with the cloud service, the user assigned ID having been computed by the identity provider based upon the cloud service ID and a user identification associating the user with the identity provider, the token being signed with an identity provider signature;
   providing the token to the application for submission to a cloud service provider for access to the cloud service; and
   obtaining access to the cloud service based at least on the cloud service provider having validated an identity provider signature as a signature of the identity provider.

2. The method of claim 1, wherein the OS cloud credential is associated with authentication information provided by the OS based upon the user successfully authenticating with the OS.

3. The method of claim 1, further comprising:
   submitting the token to the cloud service provider for the application to obtain access to the cloud service.

4. The method of claim 1, wherein the user assigned ID comprises a user pairwise ID computed by the identity provider based upon a pairwise function of the cloud service ID and the user identification associating the user with the identity provider.

5. The method of claim 1, further comprising:
   obtaining access to the cloud service based upon the cloud service provider determining the application is authorized to access the cloud service based upon the application ID.

6. A system, comprising:
   one or more processing units; and
   memory configured to store instructions that when executed by at least some of the one or more processing units to cause the system to perform at least the following:
   receive, from a client, a token request comprising (i) an application identifier (ID) identifying an application hosted by an operating system (OS) that is requesting access to a cloud service, (ii) an OS cloud credential of a user of the OS and that is associated with login credentials of the user for the OS, and (iii) a cloud service ID that is associated with a cloud service;
   authenticate the user based upon at least one of a SmartCode, a code sent by phone, a code sent by email, biometrics, or a username and password combination;
   verify that the application ID is a valid application ID for the application;
   based at least on authenticating the user, and based at least on verifying that the application ID is valid for the application, compute a user assigned ID that associated with the cloud service, the user assigned ID being computed based upon the cloud service ID and a user identification associating the user with an identity provider;
   generate a token, the token comprising (i) the user assigned ID, (ii) the application ID, and (iii) the cloud service ID;
   sign the token with a signature of the identity provider that is usable to validate that the token was signed by the identity provider; and
   provide the token to the client.

7. The system of claim 6, wherein the authenticating is based upon the SmartCode.

8. The system of claim 6, wherein the authenticating is based upon the code sent by phone.

9. The system of claim 6, wherein the authenticating is based upon the code sent by email.

10. The system of claim 6, wherein the authenticating is based upon the biometrics.

11. The system of claim 6, wherein the authenticating is based upon the username and password combination.

12. The system of claim 6, wherein the verifying that the application ID is a valid application ID for the application also includes identifying that the application is known and authorized to access the cloud service.

13. The system of claim 6, wherein the verifying that the application ID is a valid application ID for the application also includes identifying that the application is unknown, but that the cloud service will determine whether or not to grant access to the application.

14. The system of claim 6, wherein computing the user assigned ID comprises computing pairwise ID computed based upon a pairwise function of the cloud service ID and the user identification associating the user with the identity provider.

15. A system, comprising:
   one or more processing units; and
   memory configured to store instructions that when executed by at least some of the one or more processing units to cause the system to perform at least the following:
      receive a request from an application hosted by an operating system (OS) to access a cloud service;
      send a token request to an identity provider responsive to the receiving a request, the token request comprising (i) an application identifier (ID) identifying the application, (ii) an OS cloud credential of a user of the OS and that is associated with login credentials of the user for the OS, and (iii) and a cloud service ID that is associated with the cloud service;
      based at least on sending the token request, and based upon the identity provider having authenticated the user and verified that the application ID is a valid application ID for the application, receive a token from the identity provider, the token comprising (i) the cloud service ID, (ii) the application ID, and (iii) a user assigned ID that is associated with the cloud service, the user assigned ID having been computed by the identity provider based upon the cloud service ID and a user identification associating the user with the identity provider, the token being signed with an identity provider signature;
      provide the token to the application for submission to a cloud service provider for access to the cloud service; and
      obtain access to the cloud service based at least on the cloud service provider having validated the identity provider signature as a signature of the identity provider.

16. The system of claim 15, wherein the identity provider verifying that the application ID is a valid application ID for the application comprises the identity provider identifying that the application is known and authorized to access the cloud service.

17. The system of claim 15, wherein the identity provider verifying that the application ID is a valid application ID for the application comprises the identity provider identifying that the application is unknown, but that the cloud service will determine whether or not to grant access to the application.

* * * * *